United States Patent [19]
Mesnel et al.

[11] Patent Number: 5,261,206
[45] Date of Patent: Nov. 16, 1993

[54] PROFILE MADE OF ELASTOMER COMPRISING A TUBULAR ELEMENT OF ADJUSTABLE SHAPE AND ADJUSTABLE CROSS-SECTION

[76] Inventors: François Mesnel, 6 Bis Rue Salignac Fenelon, 92200 Neuilly-Sur-Seine; Gérard Mesnel, 16 rue Victor Hugo, 78420 Carrieres-Sur-Seine, both of France

[21] Appl. No.: 763,665

[22] Filed: Sep. 18, 1991

[30] Foreign Application Priority Data

Sep. 26, 1990 [FR] France .................. 90 11853

[51] Int. Cl.⁵ .................. E06B 5/00; B60J 1/08
[52] U.S. Cl. .................. 52/716.1; 52/208; 52/400; 49/374; 49/489.1
[58] Field of Search .................. 52/716, 717.1, 718, 52/208, 204, 400, 468; 49/491, 440, 374, 488, 489, 460

[56] References Cited

U.S. PATENT DOCUMENTS

| | | | |
|---|---|---|---|
| 2,610,713 | 9/1952 | Bradley | 52/717.1 |
| 2,699,581 | 1/1955 | Schlegel | 49/491 |
| 4,007,536 | 2/1977 | Soderberg | 52/400 |
| 4,505,511 | 3/1985 | Härle et al. | 52/208 |
| 4,691,392 | 9/1987 | Whitney | 52/718.1 |
| 4,920,714 | 5/1990 | Sease | 52/716 |
| 5,038,521 | 8/1991 | Andrzejewski et al. | 49/491 |

FOREIGN PATENT DOCUMENTS

| | | |
|---|---|---|
| 652706 | 5/1951 | United Kingdom . |
| 714554 | 9/1954 | United Kingdom . |
| 2130278 | 5/1984 | United Kingdom . |

*Primary Examiner*—Carl D. Friedman
*Assistant Examiner*—Winnie Yip
*Attorney, Agent, or Firm*—Scully, Scott, Murphy & Presser

[57] ABSTRACT

An elastomer profile including a central section and first and second lateral sections. The central section has a U-shaped cross section, and includes a base portion and first and second arm portions connected to and extending outward from first and second sides, respectively, of the base portion. The first and second lateral sections of the profile are connected, respectively, to the first and second arm portions of the central section, and an end portion of the second lateral section extends adjacent to the central section, and the central section of the profile and this end portion of the second lateral section form a retaining slot that is used to receive and hold and end portion of the first lateral section, to form that first lateral section into an adjustable shaped tube.

6 Claims, 5 Drawing Sheets

PROFILE MADE OF ELASTOMER COMPRISING A TUBULAR ELEMENT OF ADJUSTABLE SHAPE AND ADJUSTABLE CROSS-SECTION

BACKGROUND OF THE INVENTION

The present invention relates to a profile made of elastomer comprising a tubular element, of adjustable shape and adjustable cross-section.

It is known that such profiles comprising a tubular element are used especially for providing the seal between an opening panel and a non-opening panel and, more particularly, between an automobile door and a door frame of the body. For this purpose the profile usually comprises a portion of U-shaped cross-section forming a grip, generally provided with a metallic strength member, which may be made integral with an element projecting from the non-opening panel, and a tubular portion suitable for being elastically deformed, which is adjoining the portion of U-shaped cross-section and which is intended to be compressed between the opening panel and the non-opening panel.

In other cases, the tubular element of such profiles acts as trim and it may comprise one or more lips reinforcing its ornamental character.

For some particular forms of door frames, it would be advantageous however to be able to make use of a profile whose tubular portion had a shape capable of being adapted to the shape in question.

SUMMARY OF THE INVENTION

This is the problem the present invention proposes to solve, by proposing a profile of variable shape of the type hereinabove, the tubular portion of which may be modified in shape and in the transverse dimension.

For this purpose, the subject of the invention is a profile made of elastomer comprising a portion of U-shaped cross-section, suitable for covering an element projecting from a framework, and a tubular element adjoining one arm of the U, characterized in that the said tubular element is formed by a strip, which is integral by a first lateral portion with the said arm of the U, and the second lateral portion of which is suitable for engagement, by force, between the portion of U-shaped cross-section of the profile and a portion contiguous with the latter, in order to form the said tubular element.

By engaging to a greater or lesser extent the second lateral portion of the strip defining the tubular element between the U-shaped portion of the profile and a portion contiguous with the latter, it will thus be possible for the user of the profile to vary the shape and the cross-section of the profile.

Advantageously, in order to impart to the portion of U-shaped cross-section of the profile and to the contiguous portion a sufficient rigidity making it possible to engage, by force between these portions, the lateral portion associated with the tubular element, both these portions will comprise, in a manner known per se, a metallic strength member.

The lateral portion of the strip constituting the tubular element which is engaged between the portion of U-shaped cross-section of the profile and the portion contiguous with the latter will itself also have to have a sufficient rigidity and, for this purpose, it may comprise either a metallic strength member or have an appropriate hardness. In the case where it will comprise a metallic strength member, it will be possible to vary the shape of the tubular portion by deforming the portion provided with the strength member.

In order to facilitate the installation of the lateral portion of the strip forming the tubular element between the portion of U-shaped cross-section of the profile and a portion contiguous with the latter, at least one external surface of the said lateral portion and the surface associated with the said contiguous portion or with the said portion of U-shaped cross-section will have complementary ribbed or grooved outlines making it possible for them to cooperate by fitting together.

The second lateral portion of the strip forming the tubular element will be able to be engaged between the base of the U of the portion of U-shaped cross-section and a parallel contiguous portion of the profile, or between the strip of the U of the portion of U-shaped cross-section with which the first lateral portion of the strip is not integral and a parallel contiguous portion of the profile or even, if appropriate, between the two arms of the U.

The first lateral portion of the strip forming the tubular element may be as extruded with the profile or be adhesively bonded to the latter. It may also, as will be seen in more detail hereinbelow, be gripped, as the second lateral portion, between an arm of the U-shaped portion and a parallel contiguous portion of the profile.

BRIEF DESCRIPTION OF THE DRAWINGS

The attached drawings illustrate various embodiments of the invention. In these drawings.

DETAILED DESCRIPTION OF THE PREFERRED EMBODIMENTS

Figure 1:
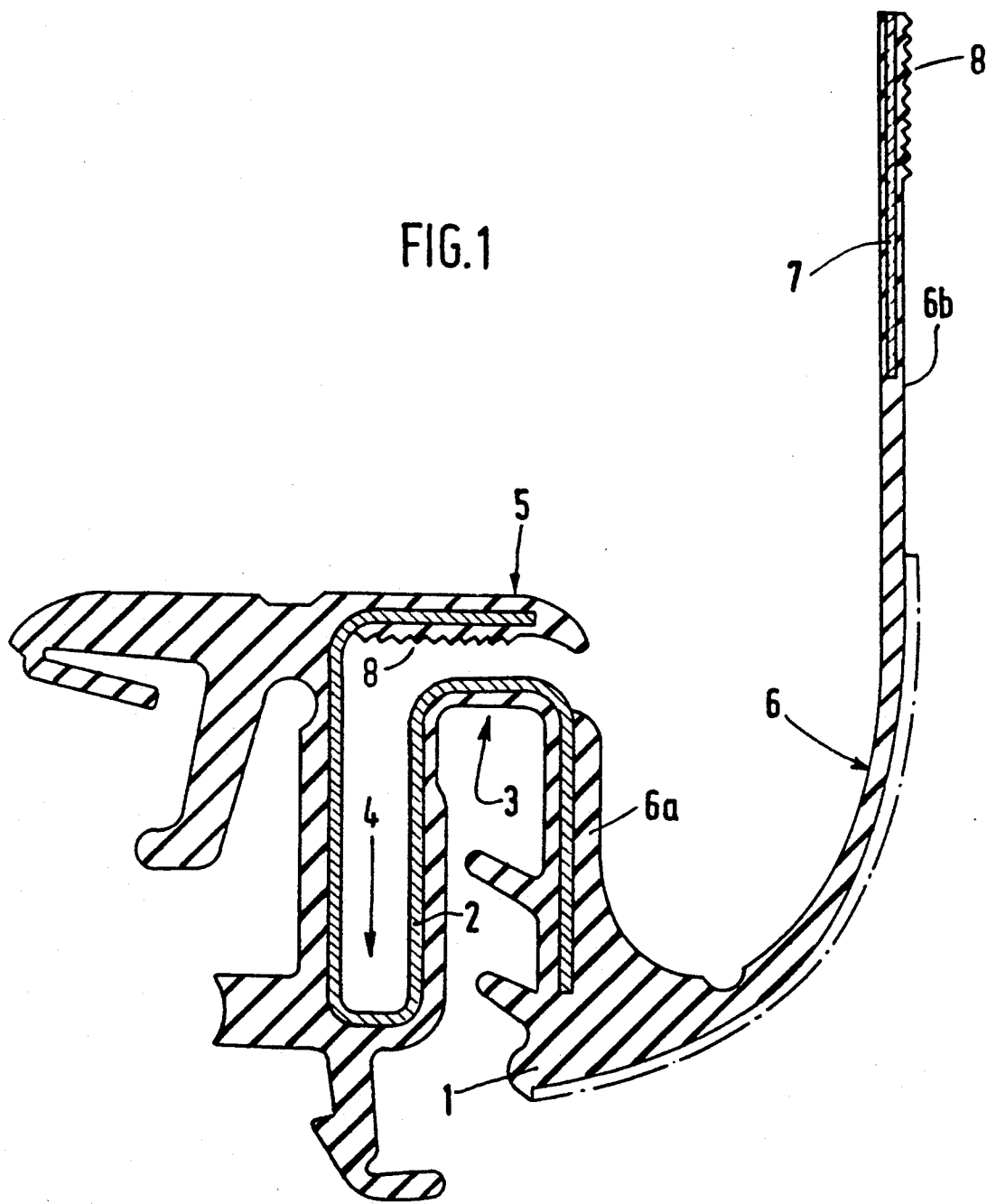
FIGS. 1, 2, 3, and 4 illustrate in transverse section a first embodiment of the invention, respectively as extruded and after shaping the tubular sealing element, the various shapes of this element shown being obtained by deformation of the second portion, provided with a metallic strength member, of the strip forming this tubular element.
Figure 2:
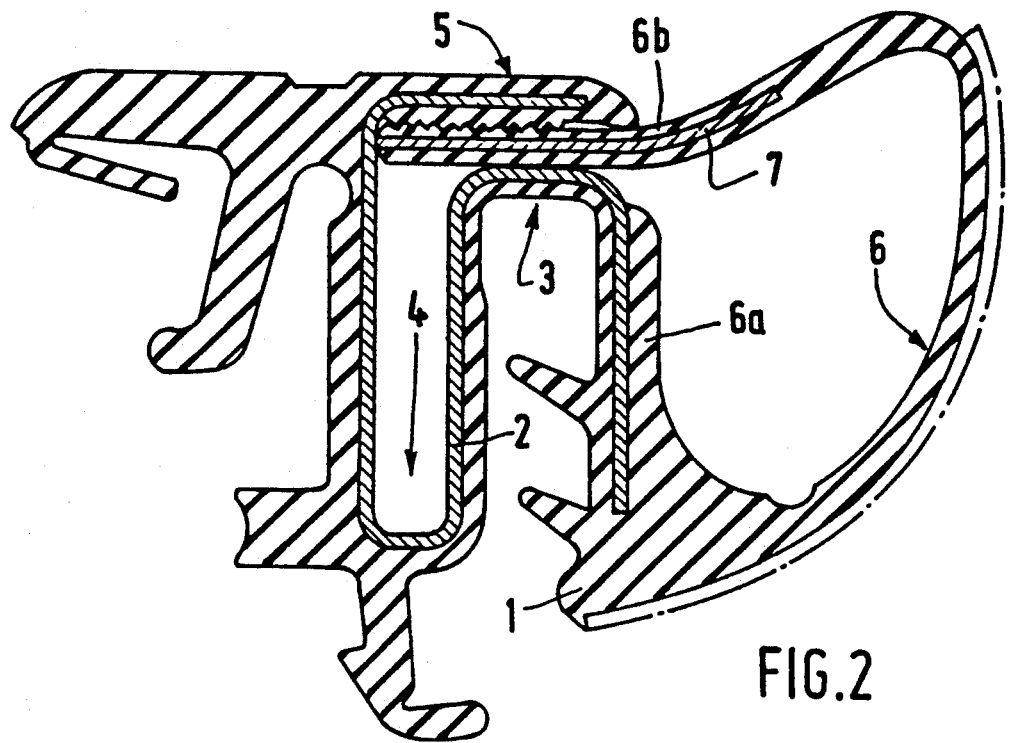
Figure 3:
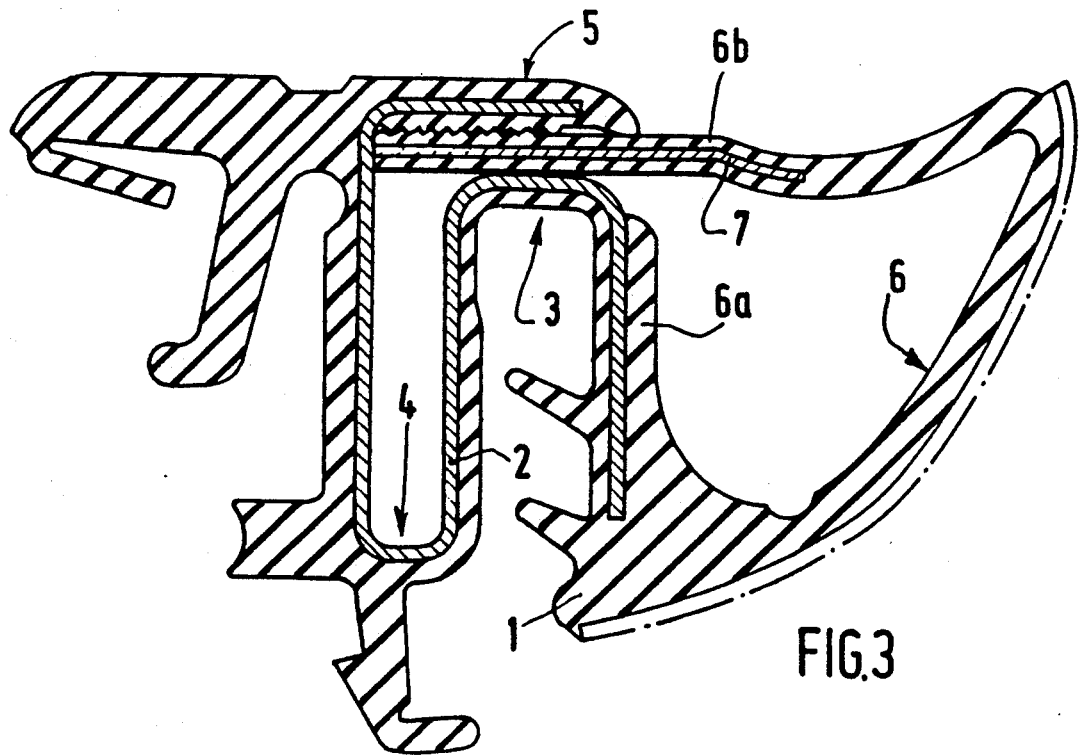
Figure 4:
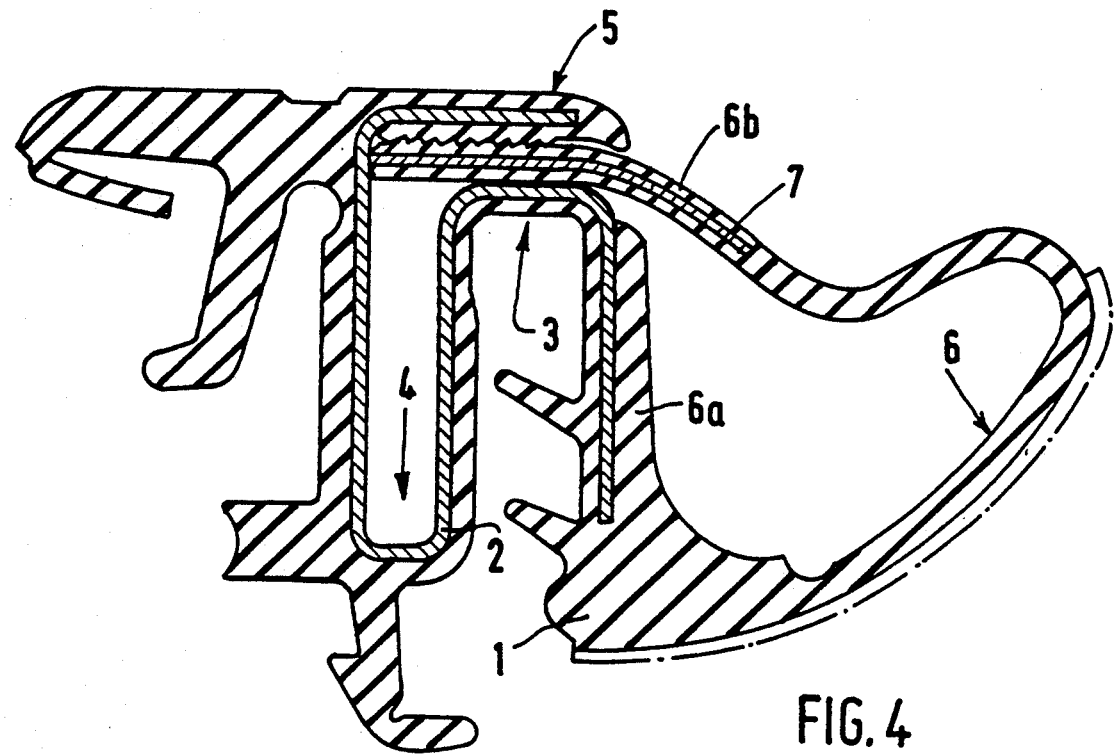

Reference will firstly be made to FIGS. 1 to 4. These figures show the same embodiment of the profile according to the invention, as manufactured (FIG. 1) and in its position of use with a tubular sealing element of varied shape (FIGS. 2 to 4).

This profile is made of an elastomer 1 and is reinforced over a portion of its length by a metallic strength member 2. The metallic strength member may be of any type known in the technical field for profiles used in the automobile industry. The reinforced portion of the profile comprises a portion 3 of U-shaped transverse cross-section, intended to be made integral, by gripping, with an element projecting from an automobile door frame, a second portion 4 of U-shaped cross-section inverted in relation to the profile of the portion 3, and a strip 5 extending the portion 4 laterally, parallel to the base of the U of the portion 3. This profile is produced by extruding the elastomer 1 over the metallic strength member 2 and exhibits various lips, whose function is known in the technical field, which are outside the scope of the present invention.

According to the invention, the profile comprises a strip 6 adjoining, by one of its lateral portions 6a, here as extruded with the rest of the profile, one arm of the U of the portion 3, and of which the other lateral portion 6b, here provided with a metallic strength member 7, may be engaged to a greater or lesser extent, by force, between the base of the U of the portion 3 and the strip 5 in order to form a tubular sealing element adjoining the portion 3. Thus, as has been shown in the drawings, the surfaces opposite the strip 5 and the lateral portion 6b of the strip 6 will exhibit at 8 grooves or ribs of complementary outline making it possible for them to cooperate by fitting together and to maintain the strip 6 locked in position.

It is thus possible, by engaging to a greater or lesser extent the portion 6b between the bottom of the portion 3 and the strip 5, to impart a variable cross-section and shape to the tubular sealing element formed by the strip 6 folded over in order to form a tube. With the portion 6b engaged for a same length between the bottom of the U of the portion 3 and the strip 5, it is also possible to vary the shape of the tubular element by deforming the metallic strength member 7 to a greater or lesser extent, as is seen in FIGS. 2, 3 and 4.

FIGS. 5 to 8 show other embodiments of the invention.

Figure 5:
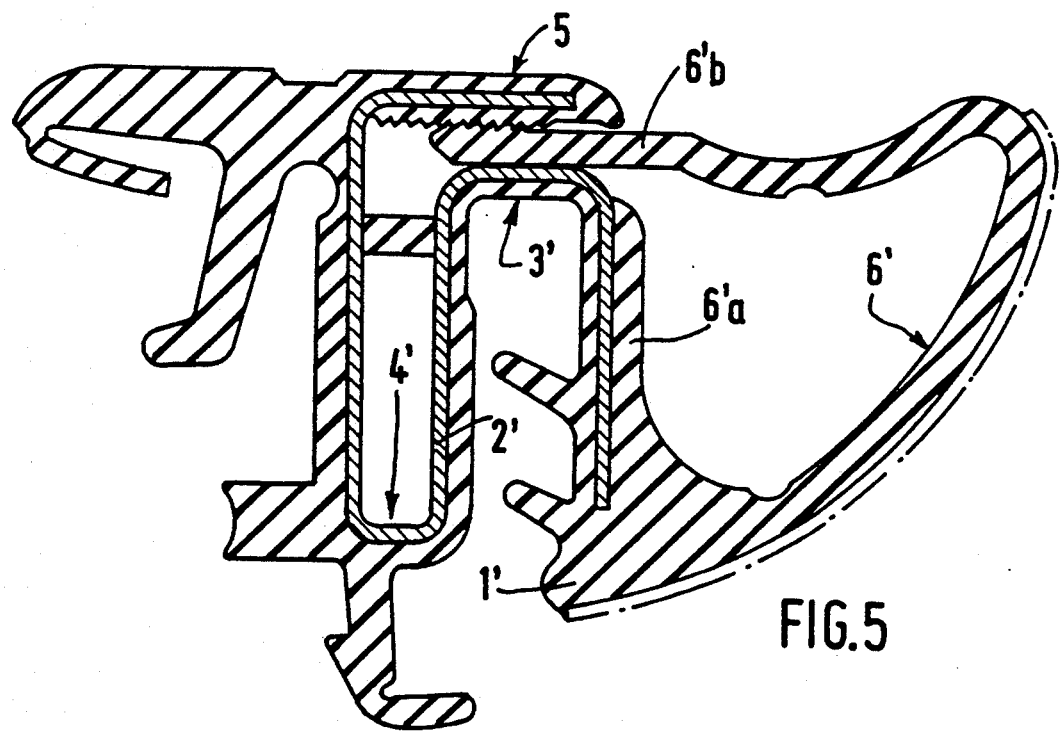
FIG. 5 is a view similar to FIG. 2, where the second portion of the tubular element does not comprise a metallic strength member.
Figure 6:
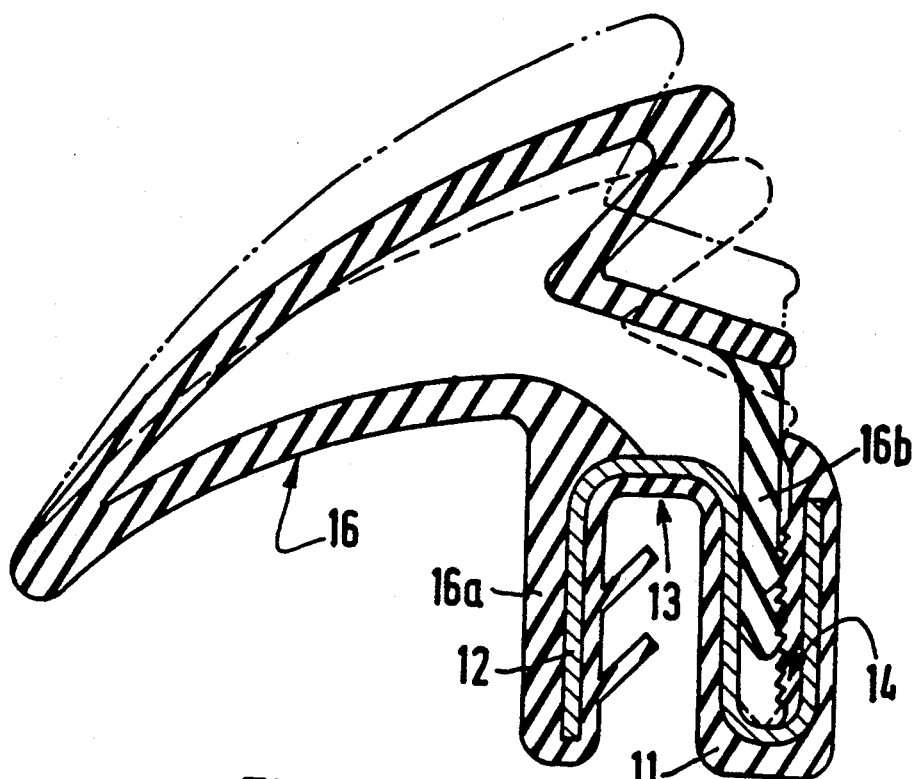
FIGS. 6, 7 and 8 are sectional views of three other embodiments of the invention.

FIG. 5, where the components already described in relation to FIGS. 1 to 4 are designated by the same reference numbers but with the suffix ' added, shows a profile similar to that of the preceding figures, with this difference, that the lateral portion 6'b of the portion 6 no longer comprises a strength member but has a sufficient hardness in order to exhibit the desired rigidity In the profile of FIG. 6, in which figure the components shown in FIGS. 1 to 4 are designated by the same reference numbers but increased by 10, the lateral portion 16b of the strip 16 is engaged between the two arms of the U-shaped portion 14 inverted in relation to that of the U-shaped portion 13, to which the strip 16 is adjoining. In this figure, the various shapes which may be assumed by the tubular portion formed by the folded strip 16, depending on whether the lateral portion 16b is to a greater or lesser extent engaged between the arms of the U of the portion 14, are shown by broken lines.

Figure 7:
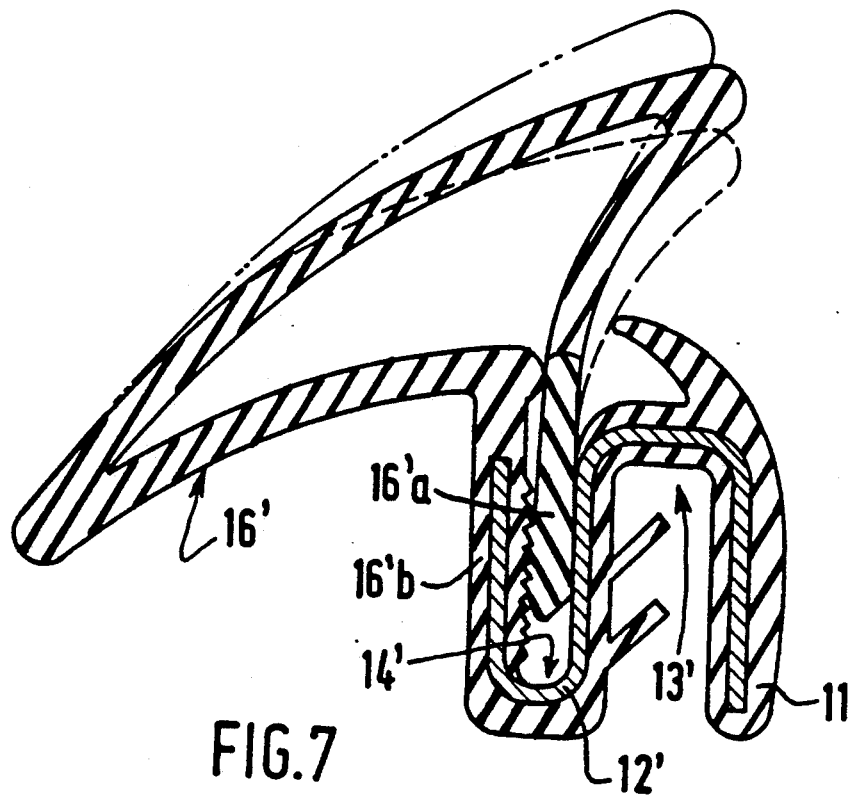

FIG. 7, where the components described in relation to FIG. 6 are designated by the same reference numbers but with the suffix ' added, illustrates an alternative form of the profile shown in this FIG. 6, where the tubular element has a different shape and where the position of the U-shaped portions, 13' and 14', is inverted in relation to those of the portions 13 and 14.

Figure 8:
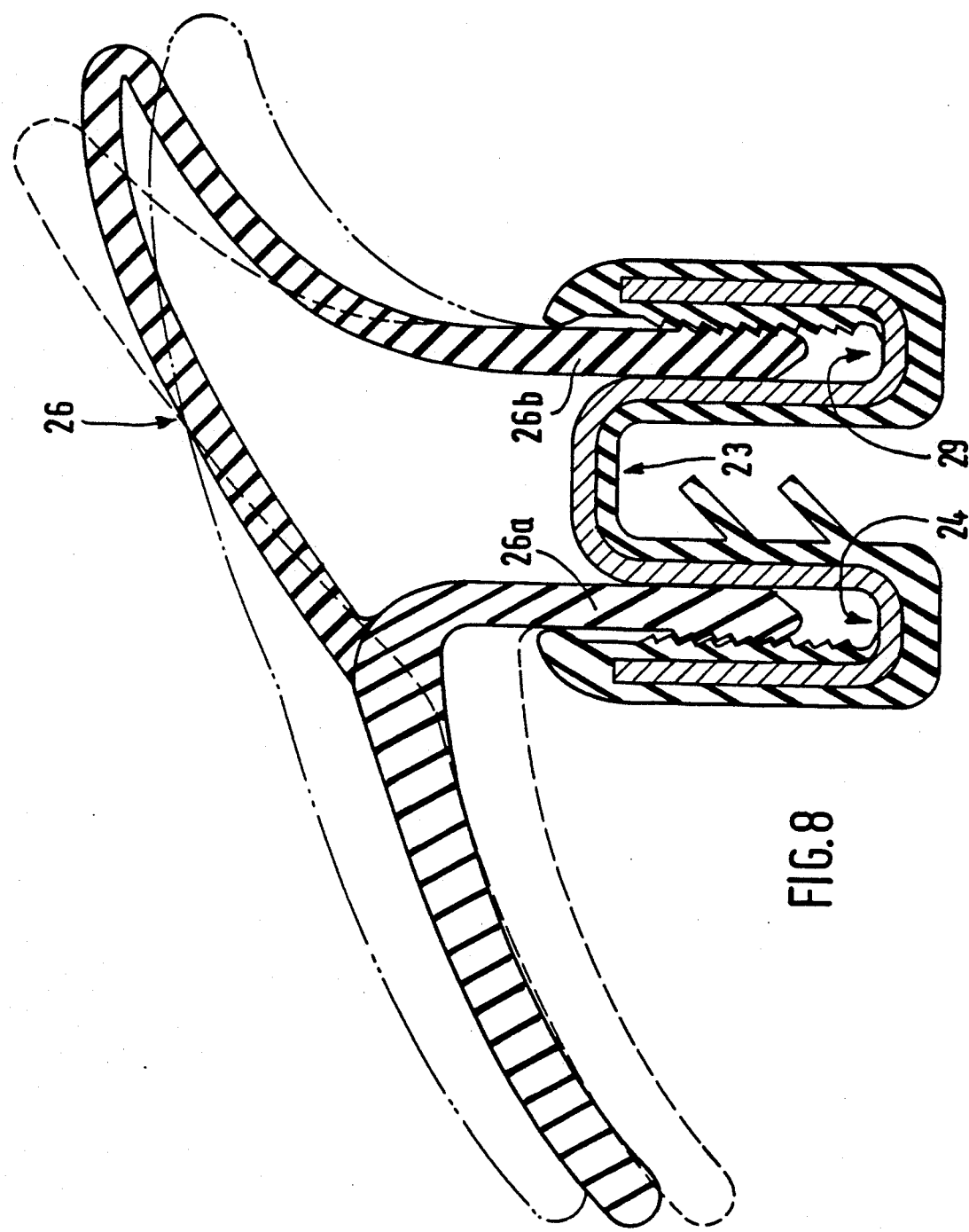

Finally, FIG. 8 shows a profile according to the invention in which the strip 26, intended to form the tubular element, is no longer as manufactured with the portion 23 of U-shaped cross-section intended to cover an element projecting from an automobile body or the like, but is distinct from the latter portion.

The arms of the U of this portion 23 are extended laterally in order to form two portions 24 and 29, of U-shaped cross-section inverted in relation to the portion 23, in which the lateral portions 26a and 26b of the strip 26 are engaged to a greater or lesser extent, in such a manner as to vary the shape of the tubular element thus produced, the various outlines of which are shown in the drawing by broken lines. In this embodiment, a lip 30 is adjoining the strip 26 and has an ornamental function.

The invention thus provides a simple and easy to install means for producing profiles comprising a tubular element of variable profile and cross-section.

We claim:

1. An elastomer profile comprising:
   a central section having a U-shaped cross section, and including a base portion and first and second arm portions connected to and extending outward from first and second sides, respectively, of the base portion;
   a first lateral section integrally connected to the first arm portion of the central section and including an end portion; and
   a second lateral section integrally connected to the second arm portion of the central section, and including an end portion extending adjacent to and spaced from the central section;
   the central section and the end portion of the second lateral section forming a retaining slot for receiving and holding the end portion of the first lateral section to form an adjustable shape tubular element adjacent the second arm portion of the central section.

2. An elastomer profile according to claim 1, wherein the central section further includes a metallic reinforcement member to increase the strength of said central section.

3. An elastomer profile according to claims 1 or 2, wherein the end portion of the first lateral section includes a metallic reinforcement member to increase the strength of said end portion of the first lateral section.

4. An elastomer profile according to claims 1 or 2, wherein the end portion of the first lateral section has a hardness sufficient to hold the end portion of the first lateral section securely in the slot between the central section and the end portion of the second lateral section.

5. An elastomer profile according to claims 1 or 2, wherein:
   the end portion of the first lateral section includes a first outside surface;
   the end portion of the second lateral section includes a second outside surface;
   the central section includes a third outside surface;
   the retaining slot is formed by said second and third outside surfaces; and
   the first outside surface and one of the second and third outside surfaces have complementary ribbed shapes.

6. An elastomer profile according to claims 1 or 2, wherein:
   the retaining slot is formed between the end portion of the second lateral section and the base portion of the central section; and
   the end portion of the second lateral section and the base portion of the central section are generally parallel to each other.

* * * * *